(12) United States Patent
Bracey et al.

(10) Patent No.: US 10,859,146 B2
(45) Date of Patent: Dec. 8, 2020

(54) ACTUATOR FOR A REGULATOR PILOT VALVE

(71) Applicant: Utonomy Ltd., Southampton (GB)

(72) Inventors: David Bracey, Eastleigh (GB); Stephen John Lewis, Chippenham (GB)

(73) Assignee: Utonomy LTD, Southaamton (GB)

( * ) Notice: Subject to any disclaimer, the term of this patent is extended or adjusted under 35 U.S.C. 154(b) by 21 days.

(21) Appl. No.: 16/344,748

(22) PCT Filed: Oct. 31, 2017

(86) PCT No.: PCT/GB2017/053266
§ 371 (c)(1),
(2) Date: Apr. 24, 2019

(87) PCT Pub. No.: WO2018/078397
PCT Pub. Date: May 3, 2018

(65) Prior Publication Data
US 2019/0346029 A1 Nov. 14, 2019

(30) Foreign Application Priority Data
Oct. 31, 2016 (GB) .................................. 1618383.2

(51) Int. Cl.
*F16K 31/04* (2006.01)
*F16H 37/08* (2006.01)
*F16H 1/46* (2006.01)
*F16H 19/02* (2006.01)
*F16H 48/08* (2006.01)
(Continued)

(52) U.S. Cl.
CPC .......... *F16H 37/0806* (2013.01); *F16H 1/46* (2013.01); *F16H 19/02* (2013.01); *F16H 48/08* (2013.01); *F16K 31/04* (2013.01); *F16K 31/046* (2013.01); *F16K 31/047* (2013.01); *F16H 2048/085* (2013.01); *F16K 27/00* (2013.01); *F16K 27/02* (2013.01)

(58) Field of Classification Search
CPC .. F16K 27/00–12; F16K 31/04; F16K 31/046; F16K 31/047; F16H 1/46; F16H 3/724; F16H 19/02; F16H 25/20; F16H 37/12; F16H 48/08; F16H 48/085; F16H 48/42; F16H 2048/085
USPC ...................................................... 251/129.11
See application file for complete search history.

(56) References Cited

U.S. PATENT DOCUMENTS 4,608,820 A * 9/1986 White ....................... F02C 9/46
251/129.11
7,325,780 B2 * 2/2008 Arai ......................... F16K 31/04
251/65

(Continued)

*Primary Examiner* — Matthew W Jellett
(74) *Attorney, Agent, or Firm* — John L. Rogitz

(57) ABSTRACT

An actuator for adjusting a pilot valve in a gas supply regulator, includes a drive electric motor to provide rotational movement to a first drive shaft, an emergency electric motor to provide rotational movement to a second drive shaft, a differential gear arrangement coupled to the first drive shaft and coupled to the second drive shaft to generate rotational movement of an actuator drive shaft from the rotational movement provided by one of the first drive shaft and the second drive shaft, and a rotary to linear device coupled to the actuator drive shaft to convert rotational movement of the actuator drive shaft into a linear movement for adjusting the pressure valve.

15 Claims, 10 Drawing Sheets

(51) Int. Cl.
*F16K 27/00* (2006.01)
*F16K 27/02* (2006.01)

(56) References Cited

U.S. PATENT DOCUMENTS

| | | | |
|---|---|---|---|
| 7,375,446 B2 * | 5/2008 | Suzuki | F16K 31/04 |
| | | | 251/129.11 |
| 8,375,993 B2 * | 2/2013 | Esche | E03C 1/04 |
| | | | 137/801 |
| 8,960,637 B2 * | 2/2015 | Parker | F25B 41/062 |
| | | | 251/129.11 |
| 9,371,931 B2 * | 6/2016 | Vrolijk | F16K 31/04 |
| 10,563,787 B2 * | 2/2020 | Yates | F16K 31/046 |
| 2005/0072049 A1 | 4/2005 | Spaziani et al. | |
| 2014/0034432 A1 | 2/2014 | Bull | |

* cited by examiner

ACTUATOR FOR A REGULATOR PILOT VALVE

BACKGROUND

The present technique relates to actuators for controlling pilot valves within regulators, such as those used by gas distribution networks (GDNs) to reduce gas from a higher pressure to a lower pressure.

A delivery pressure, or set point, of such regulators is commonly adjusted by altering the position of a fixed stop within the pilot valve against which a spring, which forms part of the pilot valve, is reacted. The accuracy of fixed stop controlled pilot valves is generally good. However, if any adjustment to the delivery pressure is needed, a visit to the regulator is required to make manual adjustment to the pilot fixed stop position. This limits the number of adjustments that can be made by a GDN without incurring significant cost.

To provide a remote means of adjustment and so that adjustments can be more easily made a pneumatically controlled bias chamber may be employed. This is attached to the pilot in place of the fixed stop. Pressure within the bias chamber acting on a diaphragm acts on the pilot valve spring in place of the fixed stop. The pressure of the gas upstream of the regulator usually provides the necessary pressure in the bias chamber. This pressure is then controlled by means of solenoid valves which in turn may be remotely controlled using an electronic controller. The addition of a pneumatic chamber may however have a detrimental effect on regulator performance, and also requires the continuous operation of a number of solenoid valves in order to maintain the necessary bias pressure. This can be detrimental to system life.

To provide a remote means of adjustment so that adjustments can be more easily made, devices are sometimes attached to regulators in place of the fixed stop. Any device installed onto gas distribution networks where a risk is present that the device could be exposed to explosive mixtures of gas and air, must also meet the requirements laid down by relevant EU and international directives to ensure the device cannot ignite the gas mixture and so cause a damaging explosion. To meet these requirements often requires that a device must be classed as 'intrinsically safe' by means of being made incapable of releasing energy which might otherwise generate an igniting spark or create an increased temperature of any component sufficient to ignite the gas mixture.

A further requirement of any device fitted to gas regulators allowing remote adjustment is that in the event of failure to the devices controller or power supply, an independent means be provided to automatically return the regulator to a known position, for example to maintain continuity of supply to the gas network.

US 2016/0017974 discloses a device for attachment to gas valves, which uses an electric actuator to adjust the position of a shaft controlling the gas valves opening. As mentioned above, a necessary feature of any remote adjustment system is that a fail to known position feature must be included which, in the event of failure of the power supply or control mechanism, will automatically return the set point of the regulator from its instantaneous position to a pre-set position. Known actuators of this type provide the fail to known position feature by using the stored energy of a spring to move the actuator to the known position. Following failure, a locking device is deactivated, allowing stored energy within the spring to be connected with the main drive by means of a gearing arrangement. A disadvantage of this type is that large amounts of energy must necessarily be stored in the spring, making meeting the requirements for the device to be intrinsically safe very difficult. A further disadvantage also applies to the design of the locking device, where electromagnets or other high energy devices which might otherwise be used, would be problematic for intrinsically safe classification.

SUMMARY OF DISCLOSURE

Embodiments of the present technique can provide an actuator for adjusting a pilot valve in a gas supply regulator, the actuator comprising a drive electric motor configured to provide rotational movement to a first drive shaft, an emergency electric motor configured to provide rotational movement to a second drive shaft, a differential gear arrangement coupled to the first drive shaft and coupled to the second drive shaft and configured to generate rotational movement of an actuator drive shaft from the rotational movement provided by one of the first drive shaft and the second drive shaft, and a rotary to linear device coupled to the actuator drive shaft and configured to convert rotational movement of the actuator drive shaft into a linear movement for adjusting the pressure valve. The differential gear arrangement is configured to drive the actuator drive shaft when one of the drive electric motor or the emergency electric motor is powered to provide a drive torque to one of the first drive shaft or the second drive shaft and the other of the drive electric motor and the emergency electric motor unpowered. By configuring a back drive torque of each of the drive electric motor and the emergency electric motor with respect to a resistive torque of the actuator drive shaft and the drive torques provided by the drive electric motor and the emergency electric motor, the drive electric motor and the emergency electric motor can be permanently connected to the actuator drive shaft through the differential gear arrangement, which obviates a requirement for a latching or braking arrangement. As a result, the actuator drive shaft can be driven by either the drive electric motor or the emergency electric motor.

Embodiments of the present technique can provide an electric actuator which addresses the problems with the prior art mentioned above. Actuators embodying the present technique can be arranged to avoid or at least reduce components which require the storage of energy or which have potential to ignite a gas mixture, and allow both adjustment of a regulator set point as directed by a separate electronic controller and include a mechanism to return automatically the set point of a regulator to a pre-set known pressure if the electronic controller fails. This is because for example, embodiments of the present technique include a second or emergency electric motor in addition to a primary or drive electric motor, which are both connected to an actuator drive shaft by a differential gear arrangement. In a first or normal mode of operation, the drive electric motor drives the actuator drive shaft via the differential gear arrangement and in a second fail to known position or emergency mode, the emergency electric motor can independently drive the actuator drive shaft via the differential gear arrangement to return the pressure valve to a known position in the event for example that the drive electric motor fails. The differential gear arrangement is configured in combination with the relative drive torques and back drive torques of each of the drive electric motor and the emergency electric motor so that either of the drive electric motor or the emergency electric motor can provide a drive torque to the actuator drive when one is powered and the other is unpowered.

As will be explained below, embodiments of the present technique can provide an advantage over conventional pneumatic adjusting systems in that during normal operation, between adjustments the pilot valve continues to operate as if it were a fixed stop type and so preserves full regulator accuracy. In addition, during normal operation and between adjustments no movement of any part is required and so the life of the system is greatly extended.

A second aspect of the present technique is directed to a gas supply regulator having an adjustable pilot valve including a spring and comprising an actuator according to the first aspect and operable to adjust the pressure valve by acting on the spring.

A third aspect of the present technique is directed to a distribution network including the gas supply regulator of the third aspect.

Various further aspects and features of the present technique are defined in the appended claims.

BRIEF DESCRIPTION OF THE DRAWINGS

For a better understanding of example embodiments of the present technique and to show how the same may be carried into effect reference is now made by way of example to the accompanying drawings in which.

DESCRIPTION OF EXAMPLE EMBODIMENTS

Figure 1:
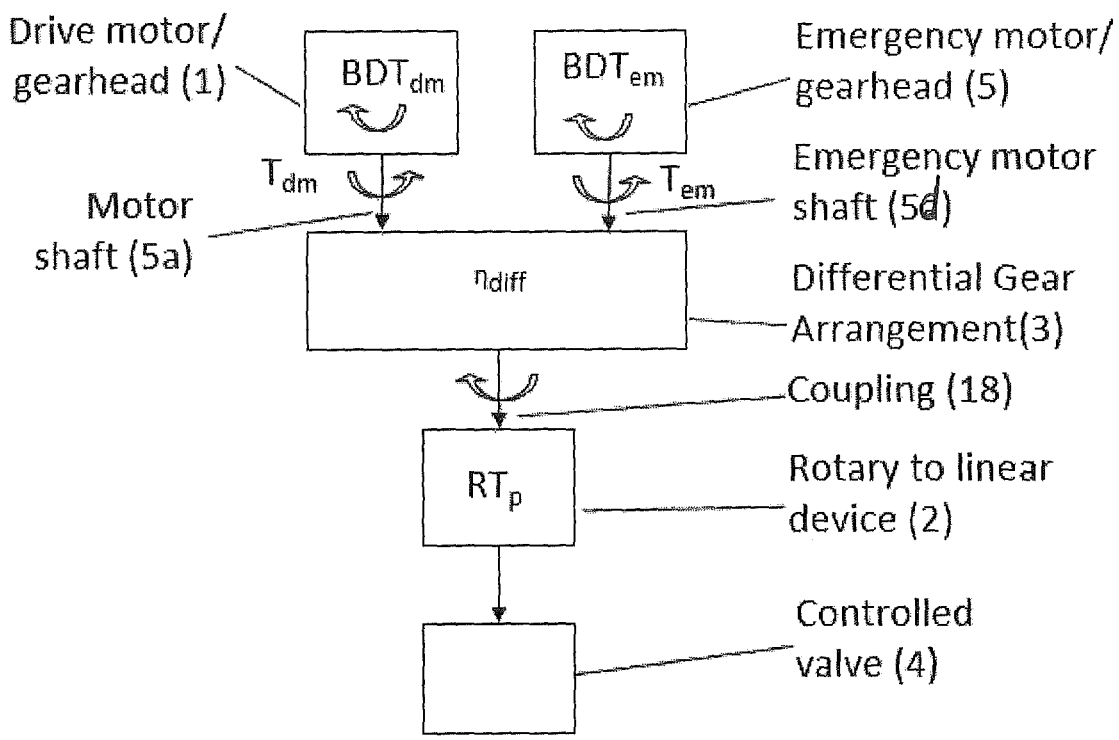
FIG. 1 is a schematic diagram of a simplified representation of an actuator according to an example embodiment of the present technique.

Embodiments of the present technique can provide an arrangement for an actuator valve which satisfies the safety requirements and addresses the technical problem set out above. An example embodiment of the actuator is set out in FIG. 1. As shown in FIG. 1, a drive electric motor 1 rotates a first drive shaft 8, which is coupled to a rotary to linear device 2, such as a ball screw or lead screw, via a conventional differential gear arrangement 3, similar to those commonly used in automotive applications via an actuator drive shaft 17. A linear output from the ball screw or lead screw is then used to to affect the position of a stop forming part of the controlled pilot valve 4 and so effect gas regulator outlet pressure. To provide a fail to known position emergency drive, a second motor 5 with independent power supply is also connected to the differential gear arrangement, using a second drive shaft 5.d, in such a way that the emergency motor may also independently rotate the actuator drive shaft 18 to drive the rotary to linear device 2 and so affect gas regulator downstream pressure. This is in contrast to other actuator fail to known position mechanisms that use energy stored in a spring to make a movement of the controlled valve as use of a motor rather than a spring eliminates stored energy from the device and so provides a system more amenable to intrinsically safe applications.

By the nature of differential gear arrangements, a possibility then exists that, when in an unpowered condition, either the drive motor or emergency motor could be back driven by the application of a torque from the other motor. Normally this possibility would be prevented by the addition of a brake or a latching mechanism between the main motor and differential and between the emergency motor and differential. By controlling the engagement of the respective brakes or latching mechanisms, torque generated by either motor could then always be directed to the actuator drive shaft 18 to drive the rotary to linear device 2 and prevented from back driving the opposing motor. As mentioned, the use of such brakes and latching mechanisms is however problematic for intrinsically safe devices as it is difficult to source or construct brakes and mechanisms that meet all of the requirements for intrinsic safety. A solution used by this invention is to instead control the path of torque generated by each motor by the careful selection of output and back drive torques for each motor, both in relation to each other and to the torque required to rotate the rotary to linear device. By this means a requirement for brakes or latching devices may be eliminated or at least reduced.

According to the example embodiments of the present technique, in order to make this selection of output and back drive torques for each motor the following rules may be applied:

1. The output torque of the drive motor must be larger than the maximum resistive torque of the differential gear, rotary to linear device and pilot valve combination ($Tdm > RTp/\eta diff$). By this means, the drive motor can operate the pilot valve 2. The back drive torque of the drive motor/gearbox combination must be greater than the quotient of torque generated by the rotary to linear device/pilot valve and differential gear efficiency ($BDTdm > RTp/\eta diff$). By this means, operation of the emergency drive motor will prefer to operate the pilot valve and not back drive the drive motor.

3. The output torque of the emergency motor must be larger than the maximum resistive torque of the Differential gear, rotary to linear device and Pilot valve combination ($Tem > RTp/\eta diff$). By this means, the emergency drive motor can operate the pilot valve 4. The back drive torque of the emergency drive motor/gearbox combination must be greater than the quotient of torque generated by the rotary to linear device/pilot valve and differential gear efficiency ($BDTem \geq RTp/$ ηdiff). By this means, operation of the drive motor will prefer to operate the pilot valve and not back drive the emergency motor.

Furthermore, at least one of the following rules may also be applied:

1. The output torque of the drive motor must be less than the quotient of the emergency motor gearbox combination back drive torque and the differential efficiency ($Tdm<BDT_{em}/\eta_{diff}$). By this means the drive motor cannot back drive the emergency motor
2. The output torque of the emergency motor must be less than the quotient of the drive motor gearbox combination back drive torque and the differential efficiency ($T_{em}<BDT_{dm}/\eta_{diff}$). By this means the drive motor cannot back drive the emergency motor
3. The backdrive torque of both the drive motor and emergency motor must be greater than the torque generated by the rotary to linear device and controlled pilot valve combination ($BDT_{dm}>RT_P$ & $BDT_{em}>RT_P$). By this means the pilot valve cannot back drive either of the drive or emergency motors when in an unpowered condition.

Figure 2A:
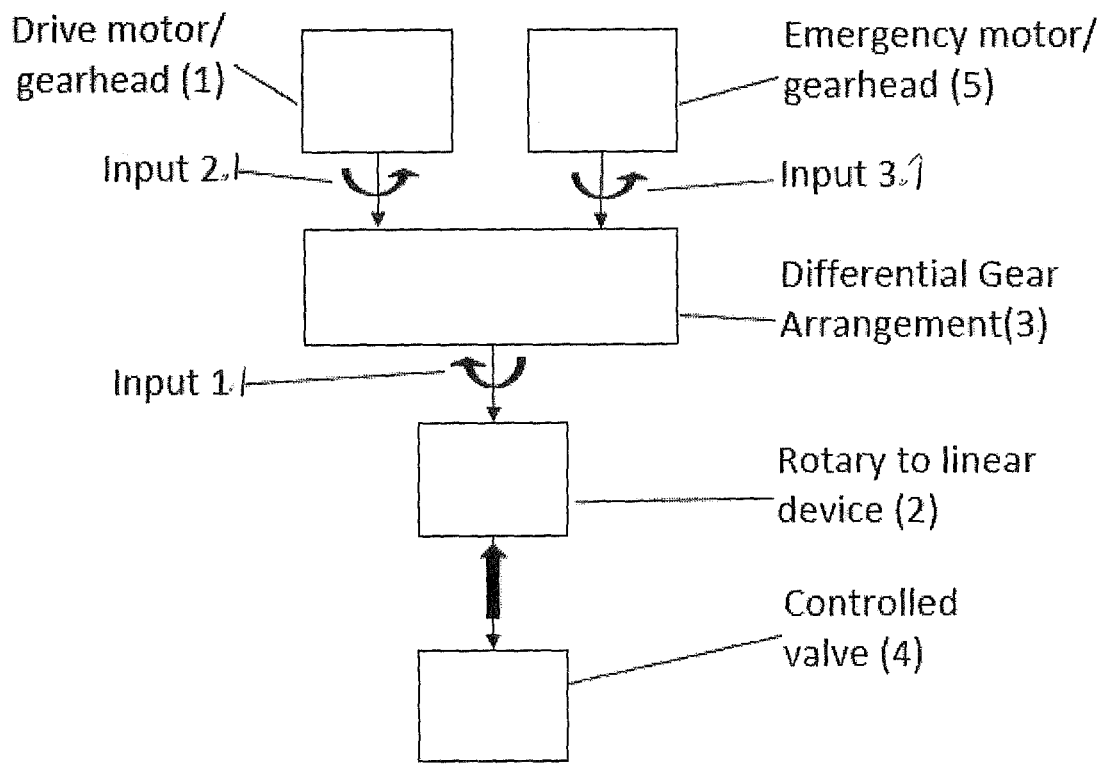
FIG. 2a to 2i are schematic diagrams of a simplified representation of an actuator shown in FIG. 1 illustrating a path of input torques and configurations of example embodiments which drive an actuator drive shaft from either a drive motor or an emergency motor which are connected to the actuator shaft by a differential gear arrangement.

Embodiments of the present technique, as for example illustrated by the example in FIG. 1, may be considered as a system having three inputs to the differential gear arrangement 3. The differential gear arrangement 3 allows any one input to communicate torque to each of the other two inputs as illustrated in FIG. 2a to 2i. As shown in FIG. 2a, input 1.1 could be considered as a torque provided by the rotary to linear device 2, generated by a force exerted by the controlled valve on the rotary to linear device. Input one must be considered as a variable as the force exerted by the controlled valve is dependent on the regulator downstream pressure.

Input 2.1 is a torque exerted by the drive motor. The motor may be on or off as required and so the torque input may also be considered as on or off.

Input 3.1 is a torque exerted by the emergency motor. The motor may also be on or off as required and so this torque input may also be considered as on or off.

Figure 2B:
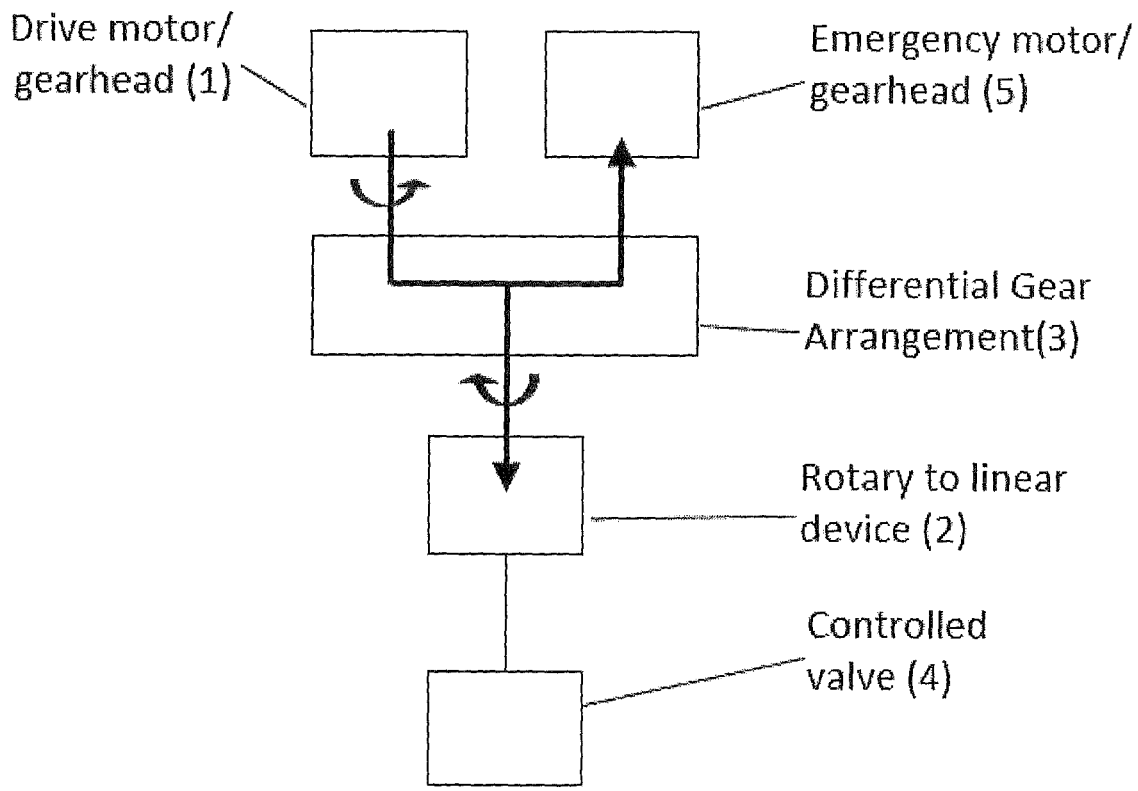

As the differential gear arrangement allows any or all of the inputs to be simultaneously transmitted to each of the other inputs it can be seen that the resultant rotational movement of the system to a particular input might be output in a number of different ways. For example, a torque input from the drive motor could perhaps be communicated as a rotation of the rotary to linear device as required, or, as a back driven rotation of the unpowered emergency motor. This is a condition that is not required because such unwanted motion would reduce the magnitude of torque applied to the controlled valve as shown in FIG. 2b.

Figure 2C:
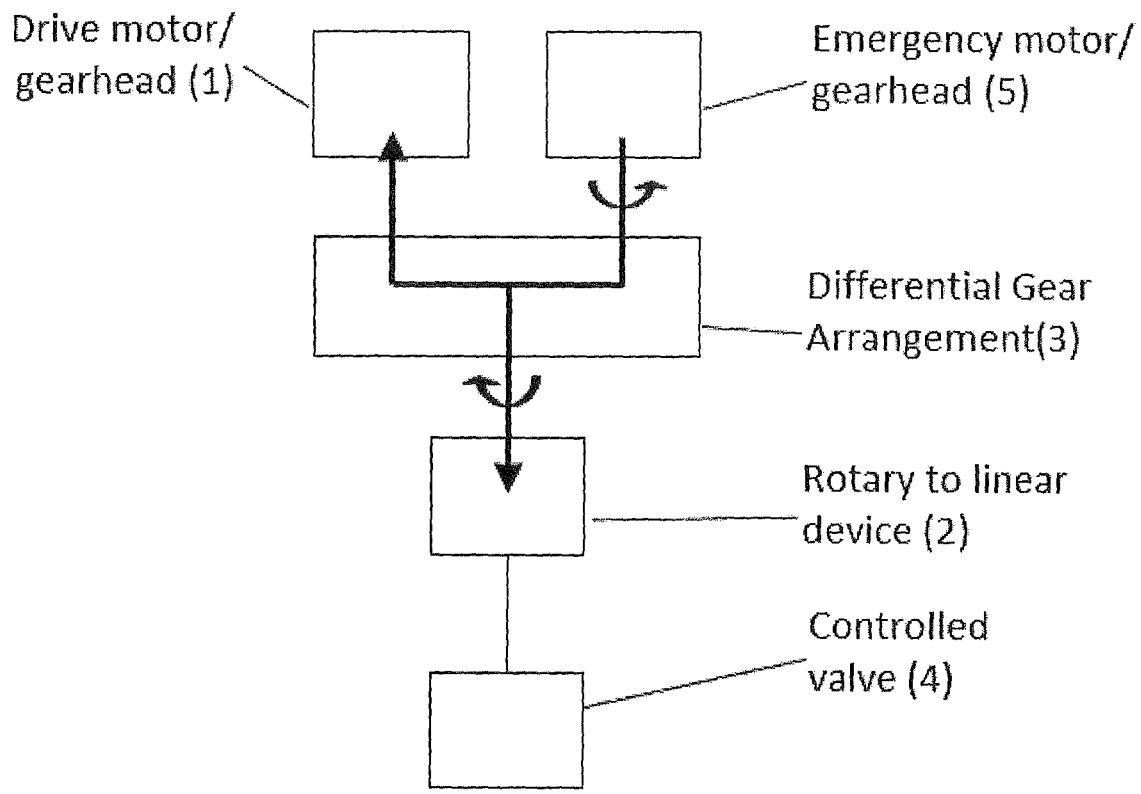

Similarly, a torque input from the emergency motor could perhaps be communicated as a rotation of the rotary to linear device as required, or, as a back driven rotation of the unpowered drive motor, which is a condition that is not required for the same reasons as shown in FIG. 2c.

Figure 2D:
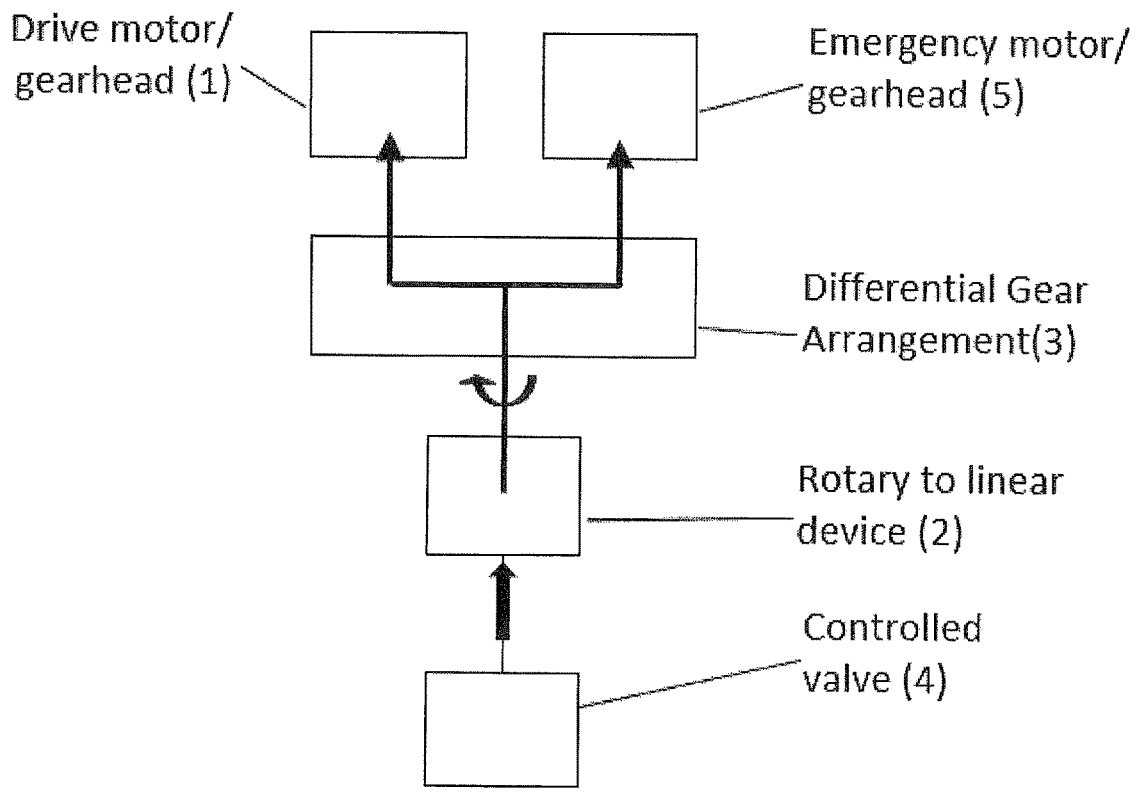

Equally, torque input from the rotary to linear device generated by the controlled valve could result in a back driven rotation of either or both of the drive and emergency motors when in an unpowered condition, which is a situation that is not required as such movement would result in loss of control of the valve position as shown in FIG. 2d.

Figure 2E:
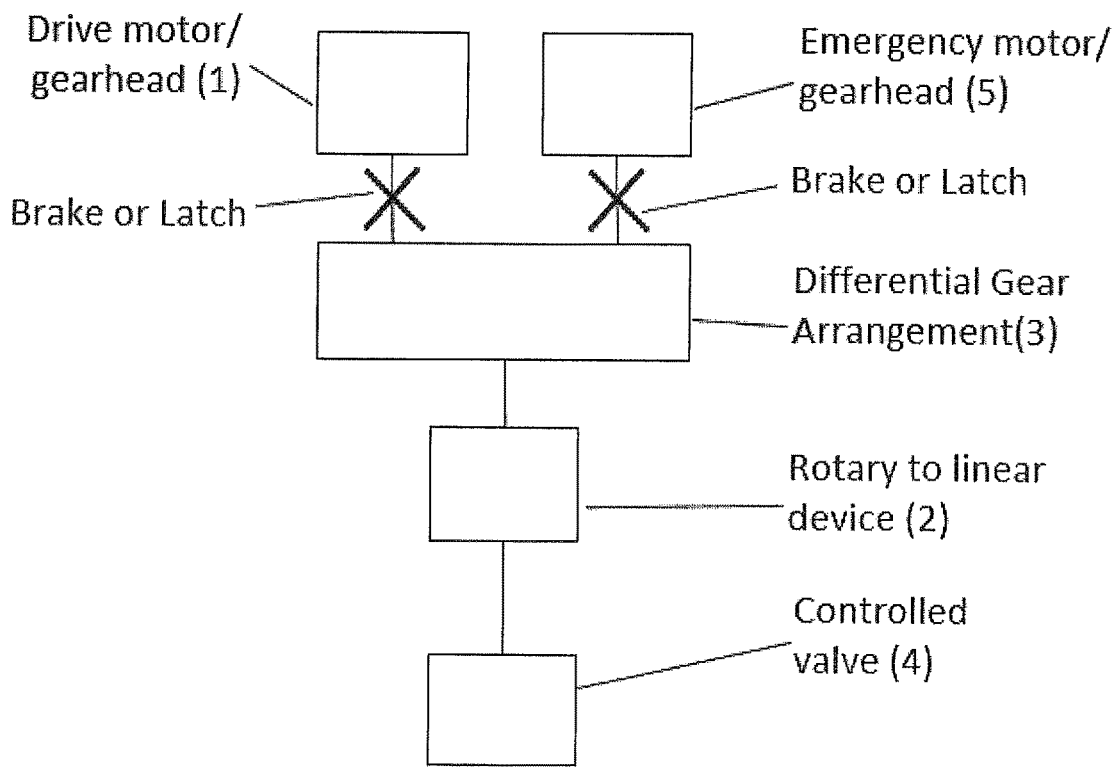
Figure 2F:
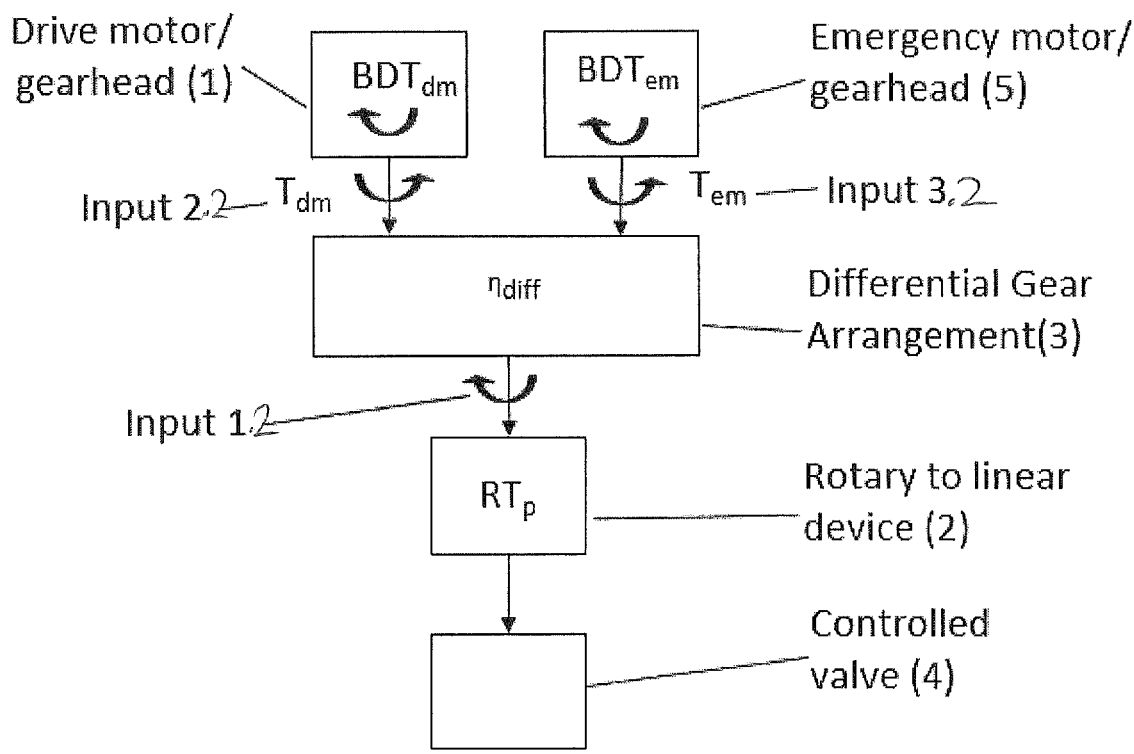

To prevent these unwanted possibilities a conventional solution is to provide brakes or latching mechanisms to the outputs of the drive and emergency motors as shown in FIG. 2e. By switching the brakes or latching mechanisms on or off as required, torque from either of the drive or emergency motors could be directed through the rotary to linear device to the control valve as required and prevented from influencing the unpowered motor. As mentioned, the use of such brakes or latches is not preferred for intrinsically safe systems.

An alternative solution provided by embodiments of the present technique is to make use of a property of geared electric motors that when the drive motor is off, it will exert a resistance to any externally applied motion of the motor input shaft. This resistance is commonly described as the motors 'back drive torque'. The magnitude of this back drive torque will usually be a fixed value and is dependent on parameters of the motor such as magnetic drag and the gear ratio of a gear head fitted to the motor.

Input 1.2 is again considered as a torque (RTp) provided by the rotary to linear device—generated by a force exerted by the controlled valve on the rotary to linear device—and is a variable as the force exerted by the controlled valve is dependent on the regulator downstream pressure.

Input 2.2 is again a torque exerted by the drive motor. The motor may be on or off as required and so the torque input may also be considered as on or off. When the drive motor is on this input torque will have a value (Tdm) dependent on the maximum torque output of the motor. When the drive motor is off it will however still exert a resistance to motion described as a back drive torque (BDTdm).

Figure 2G:
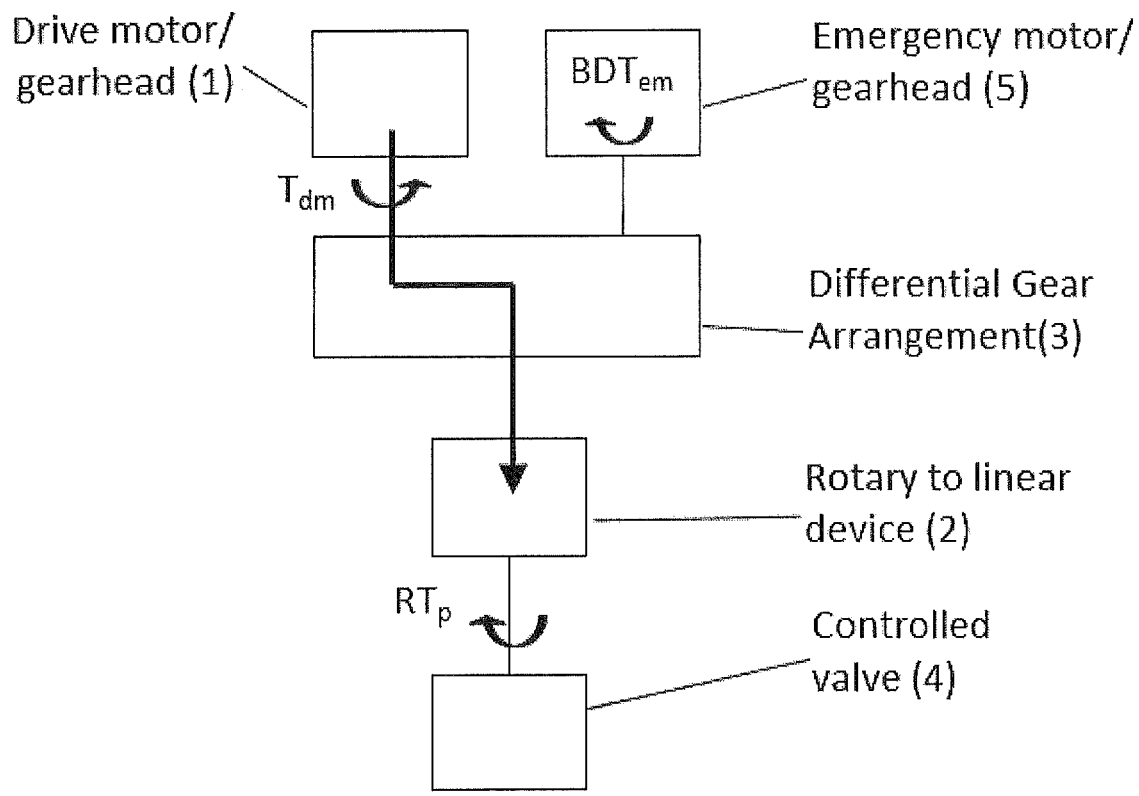

In the same way, input 3.2 is a torque exerted by the emergency motor The motor may also be on or off as required and so this torque input may also be considered as on or off. As with the drive motor the emergency motor will again also have a maximum output torque (Tem) and a fixed back drive torque (BDTem). Values of the emergency motor drive torque and back drive torque may differ from those of the drive motor. As with the motors, the differential gear arrangement will also, necessarily, exert a resistance to motion as a result of mechanical losses within the arrangements such as might occur between meshing gear teeth and rotating bearings. These losses are commonly expressed as an efficiency (rdiff). Torque from either of the drive or emergency motors must pass through the differential gear arrangement. The resultant motor output torque from the differential will therefore be a product of the motor torque (Tdm or Tem) and the differential efficiency (rdiff). Equally, the required drive or emergency motor torque necessary to overcome the resisting rotary to linear device torque will be a quotient of the resistive torque Rtp and the differential efficiency (qdiff). Torque passing between the drive and emergency motors passes through only one small stage of the differential gear arrangement. The efficiency of this small path will be much greater than that of the longer path from motors to rotary to linear device and so might be neglected, or considered, as required in order to create a worst case condition It can now be seen that if the back drive torque of the emergency motor (BDTem) is to arranged to be greater than the quotient of the maximum resistive torque of the rotary to linear device (RTp) and ndiff then the torque path from the drive motor will always be forced through the differential arrangement in the direction of the rotary to linear device and controlled valve—as required. It is obvious that the drive motor torque must be also greater that the quotient of the resistive torque RTp and qdiff in order to force movement of the rotary to linear device as illustrated in FIG. 2g.

Figure 2H:
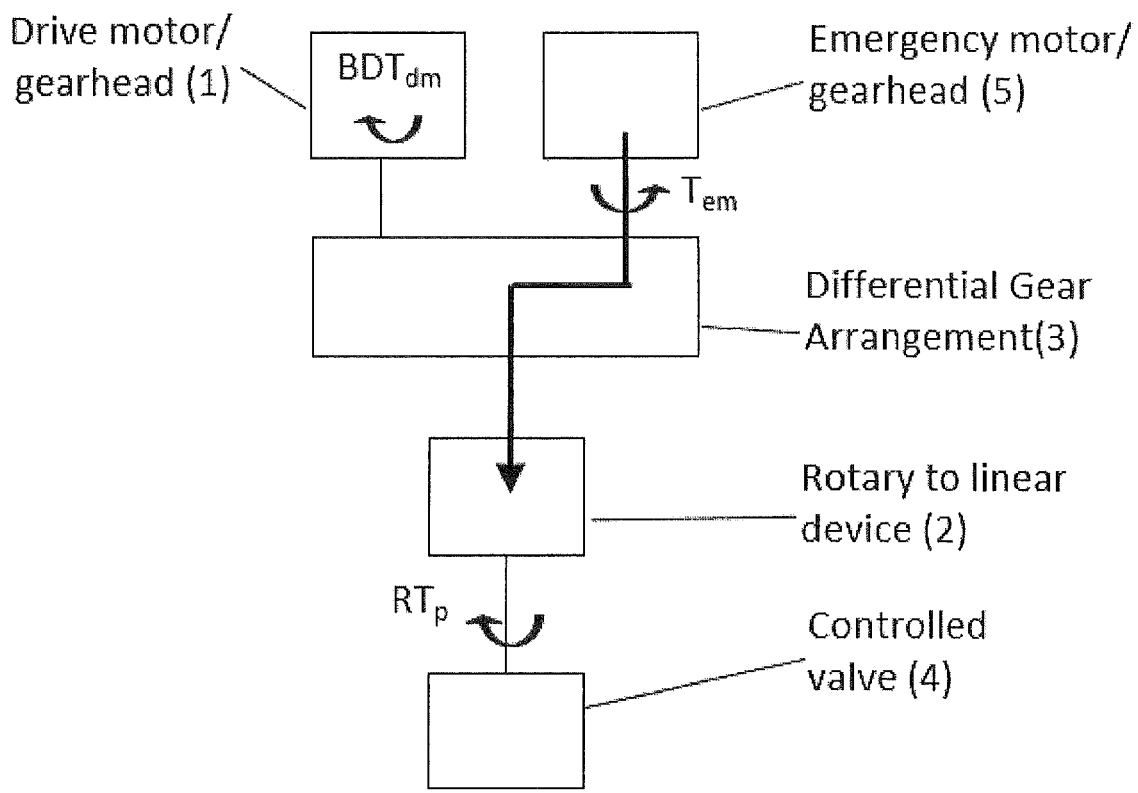

Similarly, if the back drive torque of the drive motor (BDTdm) is arranged to be greater than the quotient of the maximum resistive torque of the rotary to linear device (RTp) and ndiff then the torque path from the emergency motor will always be forced through the differential arrangement in the direction of the rotary to linear device and controlled valve—as required. In the same way the emergency motor torque (Tem) must also be greater than the quotient of the resistive torque RTp and ndiff in order to force movement of the rotary to linear device as illustrated in FIG. 2h.

Figure 2I:
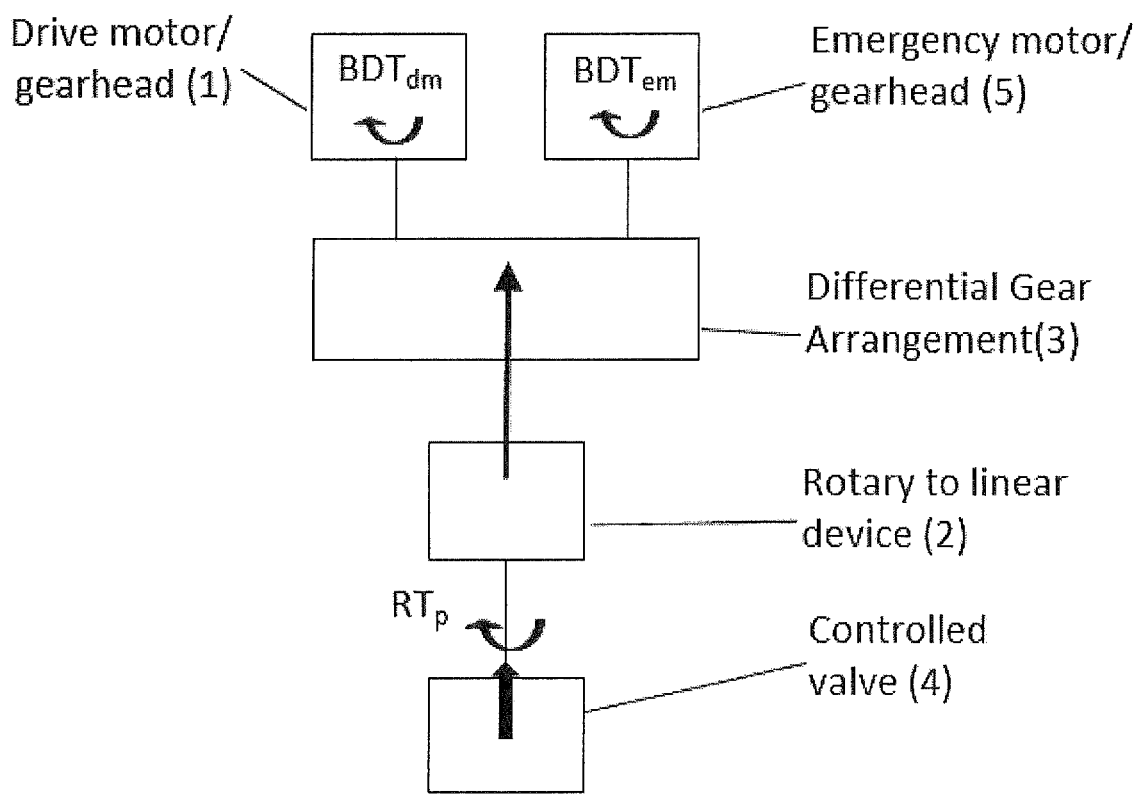

If the back drive torques of both the drive and electric motors (BDTdmandBDTem) are also arranged to be greater than the maximum torque generated by the controlled valve (RTp) then the controlled valve will not be able to back drive either of the drive or emergency motors. The controlled valve will therefore be held in a fixed position when the drive and emergency motors are unpowered, so preventing any unwanted drift of the regulator outlet pressure as illustrated in FIG. 2i.

In summary having regard to the above explanation with reference to FIGS. 2a to 2i, when unpowered, an electric motor will necessarily always present some resistance to rotation of its rotor. A small torque must therefore be applied to the motor shaft in order to rotate the motor. If connected to a gear head, the torque to rotate the rotor via the gearhead output shaft is then multiplied by a quotient of the gear head ratio and the gear head efficiency. The result can be considered as a back drive torque for the particular motor gearhead combination, the magnitude of which can be varied by selection of the gear head ratio.

By appropriate selection of motor/gearhead output torque and motor/gearhead back drive torque according to these rules, the actuator can be made to always operate the controlled valve using either motor, without the use of any additional brake, latching or other control mechanism.

Figure 3:
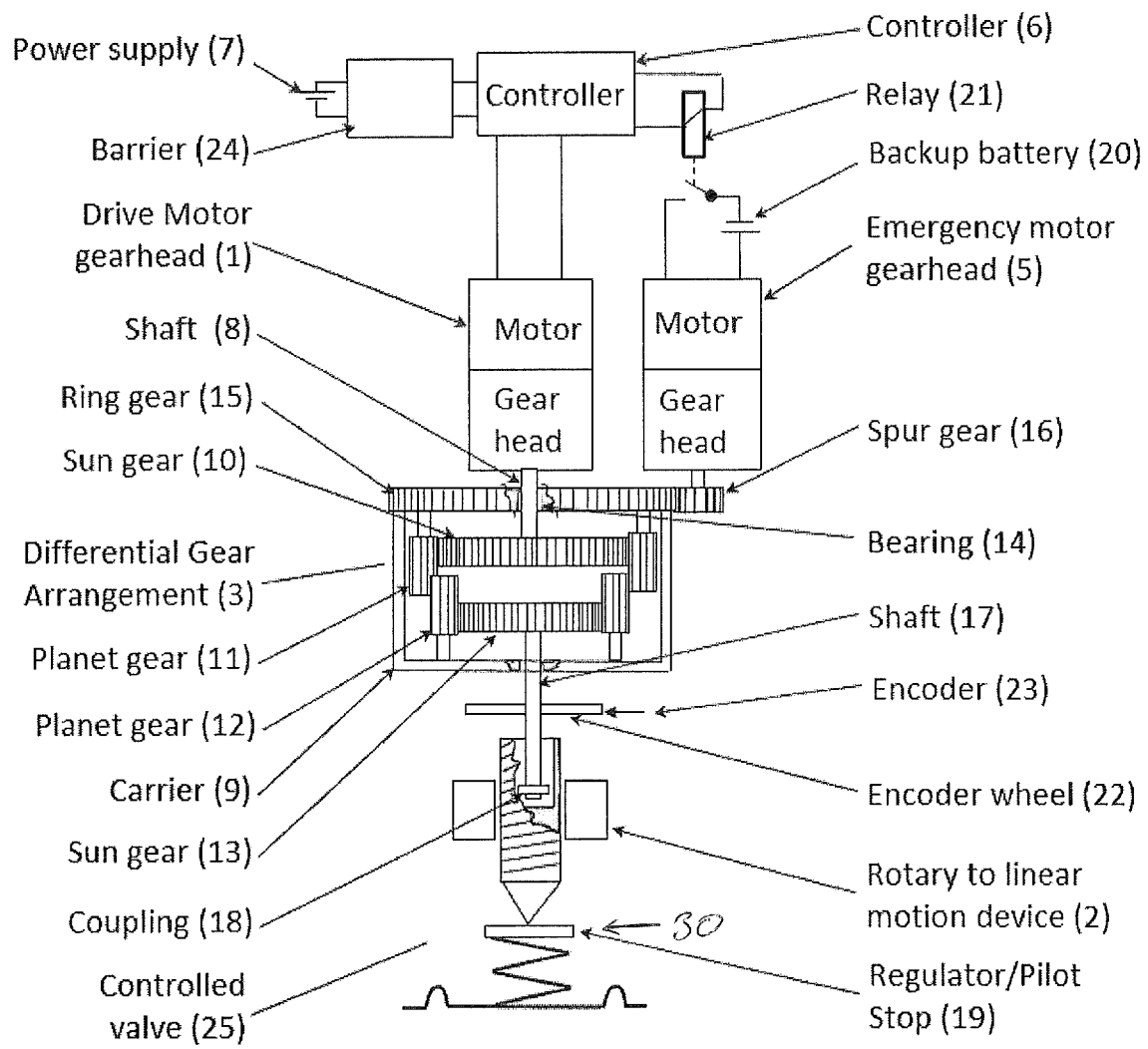
FIG. 3 is a schematic diagram of a more detailed representation of an actuator according to an example embodiment of the present technique in a first normal mode of operation.

A more detailed example embodiment of the present technique is shown in FIG. 3, in which like parts have the same numerical designations. In FIG. 3 a motor and gearhead assembly 1, controlled by a controlling device 6 and external power supply 7, rotates a shaft 8. The shaft passes through but is not connected to a carrier 9. The shaft 8 is connected to a sun gear 10 which forms part of a differential gear system 3.

A differential gear system 3 is formed by sun gear 10, two planet gears 11 and 12 and a further sun gear 13. Planet gears 11 and 12 are mounted on carrier 9 which is arranged to rotate around the motor shaft 8 via a bearing 14 which is mounted between the carrier and shaft. Carrier 9 has a gear 15 cut into its circumference and is normally held in a fixed position by engagement with a spur gear 16 connected to the emergency motor gearhead assembly 2.

In a normal operation of the gear system is then for sun gear 10 to rotate planet gear 11. Planet gear 11 then rotates planet gear 12 which in turn rotates sun gear 13. Sun gear 13 is attached to an actuator shaft 17 which connects to a rotary to linear device RLD 2 via a coupling 18. Action of the coupling 18 is to allow linear motion of the rotary to linear device 2 without affecting linear position of the actuator shaft 17. Rotation of the motor 1 is therefore converted to rotation of the rotary to linear device. Rotation of the rotary to linear device 2 converts its rotary motion to a linear motion and this linear motion is communicated to the regulator stop 19 which in turn affects outlet pressure of the controlled valve gas regulator as required. Position of the rotary to linear device 2 is sensed by an encoder 23 monitoring the angular or a linear position of an encoder wheel 22.

The fail to known position feature is provided by emergency motor 2. The emergency motor 5 has a power supply independent of the main power supply, formed by an independent backup battery 20 and a normally closed relay 21. Relay 21 is normally held in an open position by action of the controller 6. In the event of a failure of the controller 6, relay 21 moves to its default closed state and connects the backup battery 20 to the emergency motor 5 and gearhead assembly 2. The emergency motor gearhead 5 then rotates the carrier 9 via spur gear 16 and the carrier ring gear 15. Because the controller is now assumed as inactive and the main motor is therefore unpowered, sun gear 10 is held in a fixed position. The drive path then to the rotary to linear device 2 is now: emergency motor, and gearhead 5, spur gear 16, ring gear 15 and carrier 9, planet 11, planet 12, sun gear 13, shaft 17, coupling 18 rotary to linear device 2. Operation of the emergency motor is then to drive the pilot stop down from a first position 30 to its maximum position a position 32 shown in FIGS. 3 and 4 respectively, so raising the controlled regulator outlet pressure to its known safe high level as explained in the following paragraphs.

Figure 4:
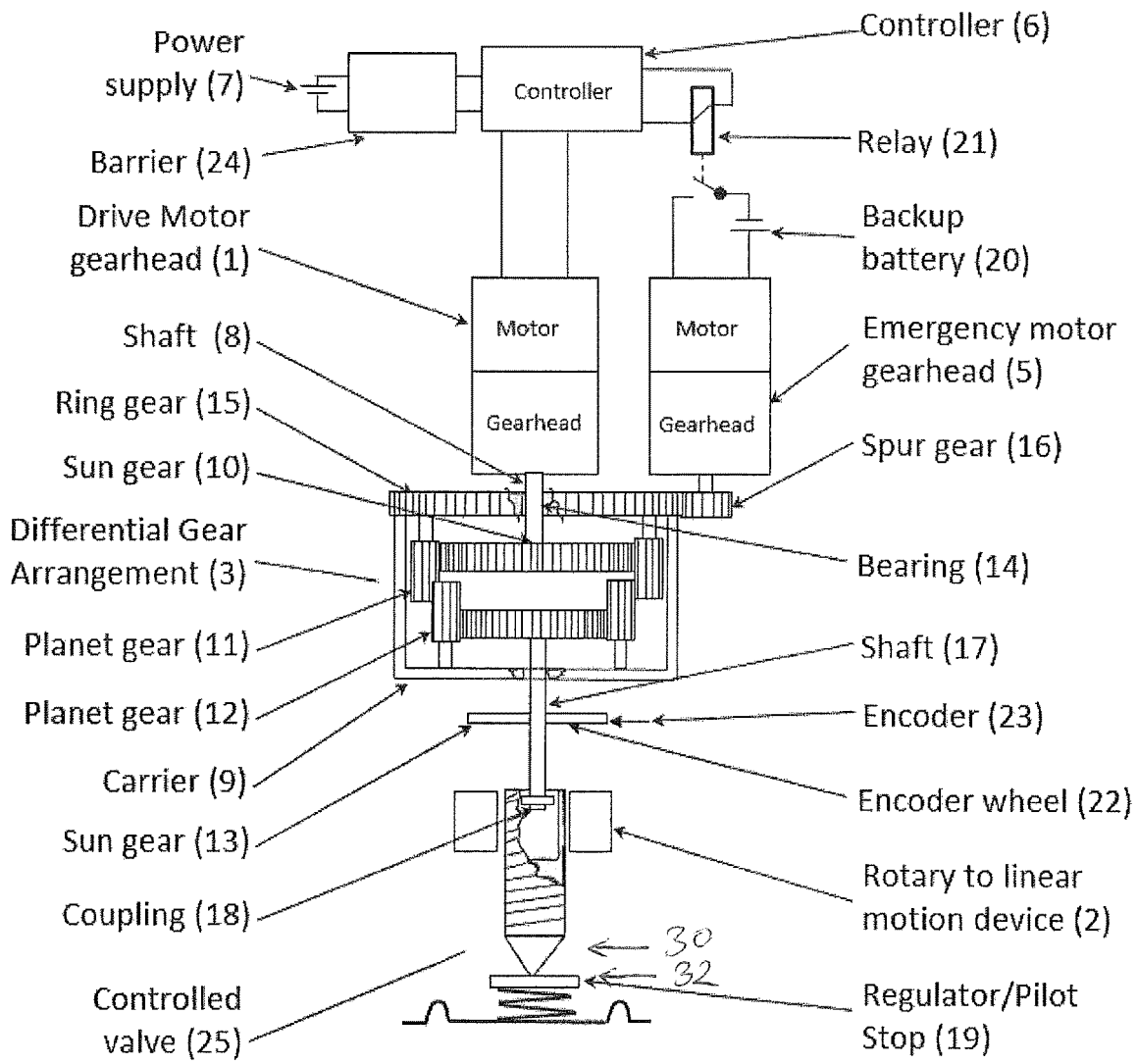
FIG. 4 is a schematic diagram of the detailed representation of the actuator according to the example embodiment shown in FIG. 3 in a second fail to known position mode of operation.
Figure 5:
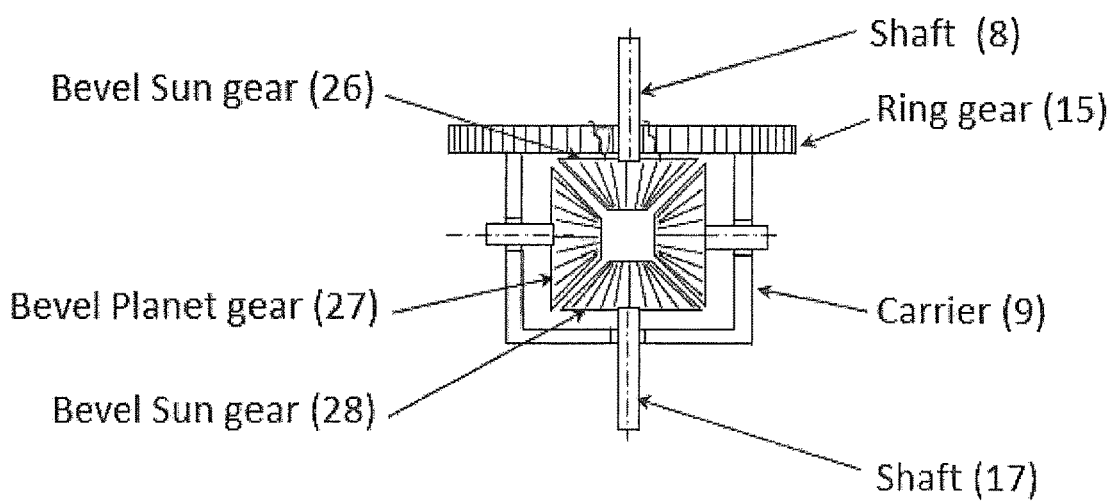
FIG. 5 is a schematic representation of another example of a differential gear arrangement according to an example embodiment of the present technique.

An alternative differential gear arrangement might be used that uses bevel gears as sun and planets rather than spur gears as in FIGS. 3 and 4 shown. FIG. 5 provides a diagram representing an arrangement which has an advantage with respect to the arrangement shown in FIGS. 3 and 4 because it can offer a higher efficiency over a spur gear arrangement as the number of gear engagements and support bearings is reduced.

According to the embodiments described above, an electric actuator can adjust the position of a pilot valve fixed stop within a gas pressure regulator as proposed. An electrically powered actuator is able to be remotely controlled so that adjustment is convenient and efficient. According to embodiments, the actuator is operated to make adjustment to the pilot valve position when required, but remains passive during periods when no adjustment is required. This has a benefit over conventional pneumatic adjusting systems in that during normal operation, between adjustments the pilot valve continues to operate as if it were a fixed stop type and so preserves full pilot accuracy. In addition, during normal operation and between adjustments little or no movement of parts is required and so the life of the system can be greatly extended, and a likelihood of failure reduced.

An electric actuator may be embodied by a simple configuration. However, an important consideration for a remote adjustment system is that in the event of failure of the electronic system controller by which the remote operation is enabled, the set point of the pilot valve can preferably be returned from its instantaneous position at failure to a pre-set known position. Commonly this will provide a gas pressure higher than the previously controlled pressure at which failure occurred. This situation may arise if, for example, during a period of low gas demand, the regulator set point pressure is required to be reduced. If during a later period gas demand becomes higher but the pressure cannot be increased because of a failure of the electronic controller, then an undesirable low pressure may develop in the gas distribution network downstream of the regulator. A fail to known pressure feature that increases the pressure addresses this issue. In a basic electric actuator design it may be that in the event of controller failure, the actuator will remain fixed in its last commanded position with no means of moving to the known pressure setting. Therefore, embodiments are provided with the ability to assume a fail-to known pressure position in the event of controller failure.

Hence, some embodiments allow adjustment of a pilot valve set point under direction of a separate electronic controller and include a mechanism to automatically return the set point of a pilot valve to a pre-set known pressure if the electronic controller fails. The fail-to-known pressure functionality is optional, however, and embodiments may comprise electrical actuation only.

It is proposed that torque may be employed to achieve a fail-to-known pressure capability. It has been found that the amount of torque required to back drive many geared motors when unpowered is less than the torque which can be output from the motor when powered. This difference offers an opportunity to provide a fail-to-known position feature for a pilot valve. A motor that adjusts the pilot valve position can be configured to operate when powered at a torque above the back driving torque, and one or more torqueing elements are then provided to always apply a separate torque, slightly above the back driving torque, in a direction which will move the system to its known pressure position. A brake operating in conjunction with the motor may prevent unwanted movement during periods between adjustments. Removal of power from the motor and brake, as may happen during a controller failure, will then always result in the system moving to its known pressure setting without any other action.

Either battery option may be implemented with either ball screw and ball nut configuration, and with either torque spring configuration. Alternative brake arrangements may be used, which may act on the drive shaft as described, but may alternatively or additionally act on other moving components to prevent or inhibit movement of the pilot stop or the carrier or other component that acts on the pilot spring to compress it and hence fix the position of the spring and the pressure permitted by the valve. Mechanical configurations other than the described drive shaft, ball nut and ball screw may be implemented to couple the motor to the pilot stop or the carrier so as to translate the rotation provided by the motor into the linear axial movement required for the pilot stop or carrier to act on the pilot spring and adjust its compression. Similarly, various components of the actuator can be configured in ways different from the detailed examples but which function in a corresponding electrical and mechanical way to achieve the same results and effects.

External Coupling Example

Figure 6:
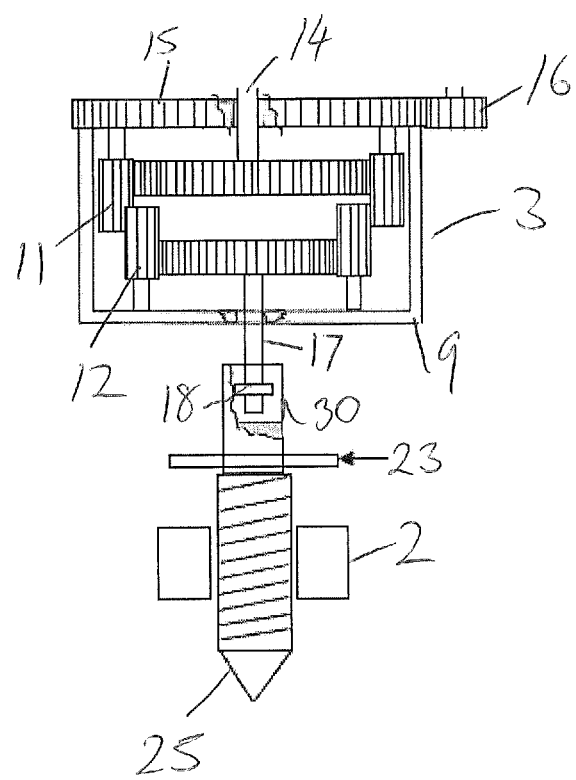
FIG. 6 is a schematic diagram providing a detailed representation of an actuator according to another example embodiment in which a coupling of the actuator drive shaft to a rotary to linear device is external to the rotary to linear device.

According to another embodiment an alternative coupling arrangement might be used that places the coupling (18) external to the rotary to linear device 2 (ball screw). FIG. 6 provides a schematic diagram of a cross-sectional view of an actuator showing an arrangement in which the coupling of the linear to rotary device 2 is external to the linear to rotary device when coupling the linear to rotary device to the drive shaft 17. This arrangement has an advantage that it will allow the use of smaller ball screw diameters, while still maintaining the torque capacity of the large ball screw internal coupling arrangement.

Housing Structure Examples

Parts of the actuator according to example embodiments can be mounted within a housing providing a supporting structure capable of maintaining positions of the parts, both in relation to each other and in relation to the pilot valve that is to be controlled. Materials used to construct the supporting structure should be selected so as meet the requirements of applicable directives for controlling explosive atmospheres.

Figure 7:
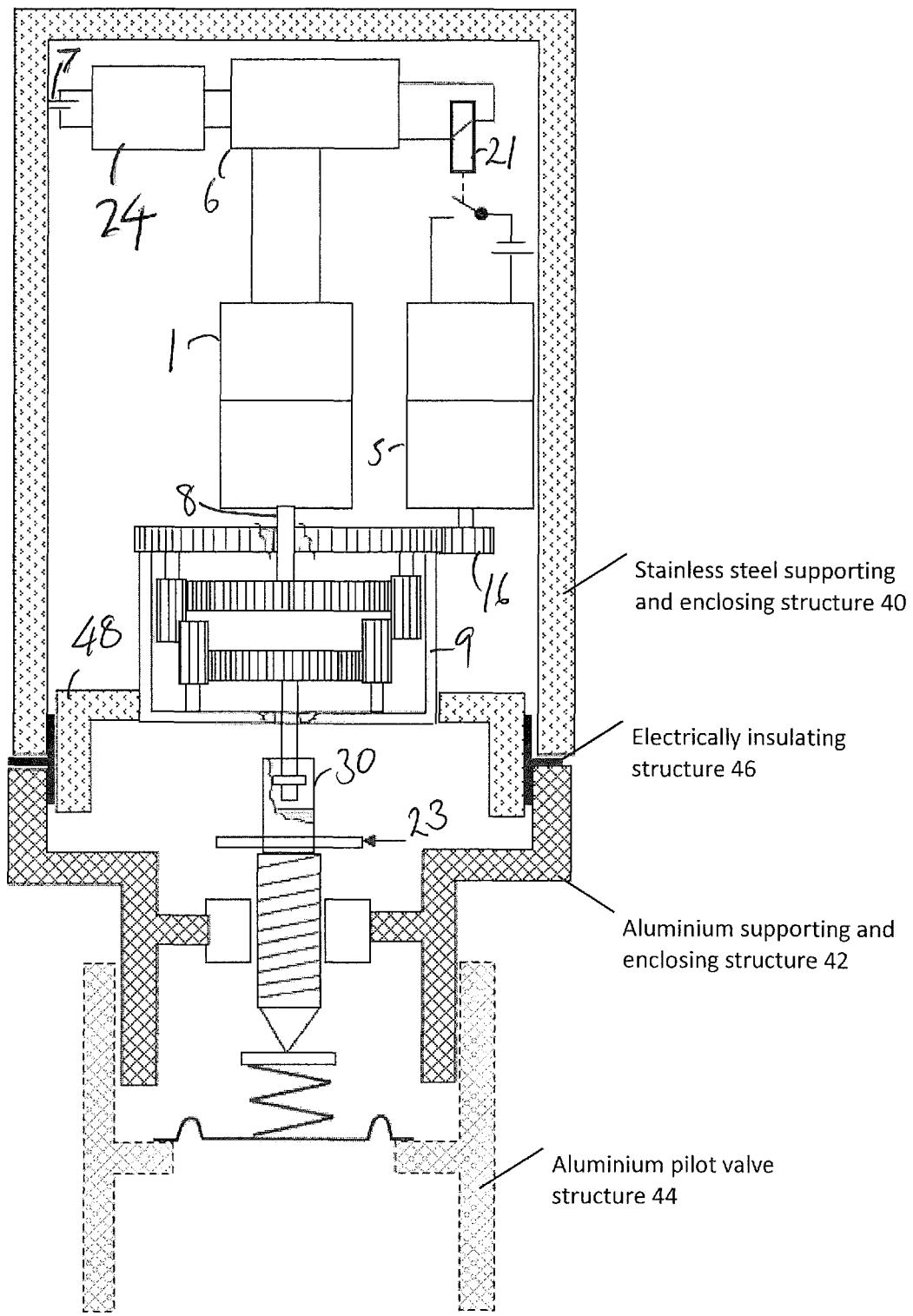
FIG. 7 is a schematic diagram of a cross-sectional view of an actuator providing an example embodiment which includes an example housing including and support structures.

An example embodiment of the present technique showing a support structure or a housing is shown in FIG. 7. In FIG. 7 the actuator according to the previously described embodiments is housed by a support structure comprising a first section formed from stainless steel 40, and a second section 42 formed from aluminium, which is configured to mate with a pilot valve structure 44. An electrical insulating structure 46 is shown to separate the first stainless steel section 40 from the second aluminium section 42. The first stainless steel supporting structure also includes a lower section 48 which supports the differential gear arrangement 9.

The materials used to construct the supporting structure should also be selected so as to be sufficiently corrosion resistant to allow use of the actuator in corrosion promoting environments. The materials used to construct the supporting structure should also be selected so as to not create a damaging corrosion cell when installed into the pilot valve to be controlled.

Applicable directives for controlling explosive atmospheres require that supporting structures of the actuator surrounding the electric motors and differential gear arrangement be constructed of materials that, if subjected to impact, cannot create a spark capable of igniting an explosive atmosphere. Such materials include stainless steel.

Supporting structures of the actuator surrounding the electric motors and differential gear arrangement can therefore be constructed using stainless steel as material 40. Pilot valve and regulator supporting structures are often constructed using aluminium as materials for their supporting structures 44 When installed in corrosion promoting environments, aluminium placed in contact with stainless steel will create a damaging galvanic corrosion cell. Embodiments of the present technique can provide an arrangement in which stainless steel as a material for constructing actuator supporting structures are not installed in direct contact with the pilot valve or regulator. As such, aluminium placed in direct contact with aluminium pilot valve or regulator materials will not generate a damaging galvanic corrosion cell as any galvanic potential between the two parts will be negligable.

Supporting structures of the actuator interfacing with the pilot valve or regulator can therefore be constructed using aluminium as material 42 According to some embodiments, to prevent a damaging corrosion cell being produced between stainless steel and aluminium parts of the actuator support structures, an insulating material is placed between the two materials to provide electrical insulation. Insulating structures of the actuator placed between stainless steel and aluminium structures of the actuator can therefore be constructed using Nylon, ABS or any other electrically insulating material 46.

Sealing Embodiment

The actuator may be used in applications where it will be submerged in groundwater. To prevent groundwater from entering the actuator enclosure, a system of seals may be added to the actuator.

Figure 8:
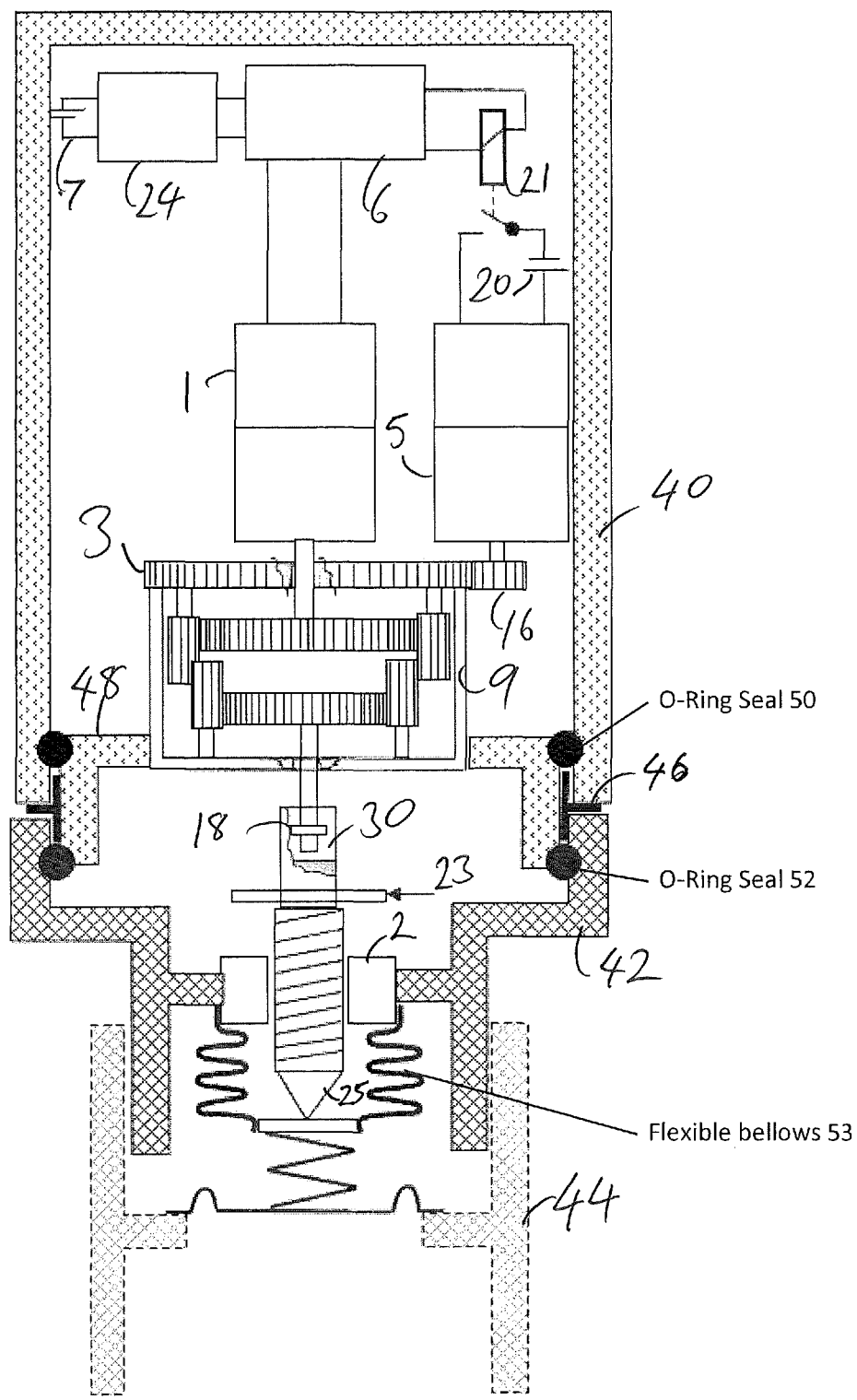
FIG. 8 is a schematic diagram of a cross-sectional view of an actuator according to the example embodiment in FIG. 7 adapted to be resistant to wet for applications in wet environments.

FIG. 8 provides a further illustration of an example embodiment of the present technique which is suitable for wet environments. FIG. 8 corresponds substantially to the example embodiment shown in FIG. 7 and so only the differences will be described. However, as shown in FIG. 8 if an O-ring seal 50 is disposed between the lower mounting bracket 48 and the stainless steel support structure 40. A second O-ring seal 52 is disposed between a lower part of the mounting bracket 48 and the second part of the support structure 42 made from aluminium. Furthermore a flexible bellows 53 is located between the end of the control valve 25 and the top of the rotary to linear device 2. In combination the O-ring seals 50, 52 and the flexible bellows 53 serve to provide a substantially watertight arrangement of the actuator according to an example embodiment.

To prevent groundwater from entering the actuator at the interface between the stainless steel and aluminium parts of the actuator support and enclosing structures, two or more O-ring type seals 50, 52 may be placed between the aluminium and stainless steel parts. To prevent groundwater from entering the actuator at the interface between ball screw, ball nut and aluminium supporting and enclosing structure parts of the actuator, a flexible bellows 53 may be placed between the support structure and the regulator pilot valve stop.

According to an example embodiment of the present technique there is provided an actuator comprising a first support structure housing the differential gear arrangement, and a second support structure coupled to the first support structure for housing the rotary to linear device and for mounting the actuator on the pilot valve wherein the first support structure is made from stainless steel and the second support structure is made from aluminium and the support structure comprises an electrical insulating structure insulating the first support structure from the second support structure.

According to another embodiment of the present technique there is provided an actuator wherein at least one O-ring seal is provided between the first support structure and the second support structure and a flexible bellows is provided between the rotary to linear device and the pilot valve.

Various alternatives within the scope of the appended claims will be apparent to the skilled person.

Further aspects and features of the present invention are defined in the appended claims. It would be appreciated that example embodiments do not limit the scope of the claimed invention and various modifications may be made to the example embodiments such as positioning the motor and the differential gear horizontally or in an inverted fashion or some other orientation of the rotary to linear device the differential gear arrangement and the electrical motors may be formed outside the explicit examples of the vertical mounting of the electrical motors the differential gear arrangement above the rotary to linear device and the pilot valve.

For ease of reference the following provides a summary of the reference numerals used for each of the parts shown in the drawings:

1. Drive moto/gearhead
2. Rotary to linear device
3. Differential Gear Arrangement
4. Controlled valve
5. Emergency motor/gearhead
6. Controller
7 Power Supply
8. Shaft
9. Carrier
10 Sun gear
11. Planet gear
12. Planet Gear
13. Sun gear
14 Bearing
15. Ring gear
16. Spur gear
17 Shaft
18. Coupling
19 Regulator/Pilot Stop
20. Backup battery
21. Relay
22. Encoder wheel
23 Encoder
24. Barrier
25. Controlled valve
26 Bevel Sun gear
27. Bevel Planet gear
28. Bevel Sun gear
30. Pilot stop first position
32. Pilot stop maximum position
40. First stainless steel support structure of an actuator
42. Second aluminum support structure of the actuator
44. Pilot valve structure made from aluminum
46. Electrically insulating structure
50. O-ring seal
52. O-ring seal
53. Flexible bellows The following numbered paragraphs provide further example aspects and features of example embodiments:

Paragraph 1. An actuator for adjusting a pilot valve in a gas supply regulator, the actuator comprising:

a drive electric motor configured to provide rotational movement to a first drive shaft, an emergency electric motor configured to provide rotational movement to a second drive shaft, a differential gear arrangement coupled to the first drive shaft and coupled to the second drive shaft and configured to generate rotational movement of an actuator drive shaft from the rotational movement provided by one of the first drive shaft and the second drive shaft, and a rotary to linear device coupled to the actuator drive shaft and configured to convert rotational movement of the actuator drive shaft into a linear movement for adjusting the pressure valve, wherein the differential gear arrangement is configured to drive the actuator drive shaft when one of the drive electric motor or the emergency electric motor is powered to provide a drive torque to one of the first drive shaft or the second drive shaft and the other of the drive electric motor and the emergency electric motor unpowered.

In one example, the drive torque provided by the drive electric motor and the emergency electric motor when powered is arranged with respect to a back drive torque of the drive electric motor and the emergency electric motor so that when one of the drive electric motor or the emergency electric motor is powered, the drive electric motor or the emergency electric motor can overcome a resistive torque of the actuator drive shaft to drive the actuator drive shaft and not drive the other of the drive electric motor or the emergency electric motor when unpowered.

Paragraph 2. An actuator according to paragraph 1, wherein the drive torque provided by the drive electric motor is larger than a combination of a resistive torque of the differential gear arrangement and the actuator drive shaft driving the rotary to linear device to adjust the pressure valve.

Paragraph 3. An actuator according to paragraph 1 or 2, wherein a back drive torque of the drive electric motor is greater than a quotient of the drive torque applied to the actuator drive shaft generated by the rotary to linear device and an efficiency of the differential gear arrangement, when the drive electric motor is in an unpowered state.

Paragraph 4. An actuator according to any of paragraphs 1 to 4, wherein the drive torque of the emergency electric motor is larger than a maximum resistive torque of a combination of the differential gear arrangement and the actuator drive shaft driving the rotary to linear device for adjusting the pressure valve.

Paragraph 5. An actuator according to paragraph 3 or 4, wherein a back drive torque of the emergency drive electric motor is greater than a quotient of a torque of the actuator shaft generated by a combination of the rotary to linear device, the pressure valve and the efficiency of the differential gear arrangement.

Paragraph 6. An actuator according to any of paragraphs 3, 4 or 5, wherein the drive torque of the drive electric motor is less than the quotient of a combination of a back drive torque of the emergency motor and the efficiency of the differential gear arrangement.

Paragraph 7. An actuator according to paragraphs 4, 5 or 6, wherein the drive torque of the emergency electric motor is less than a quotient of a combination of the back drive torque of the drive electric motor and the efficiency of the differential gear arrangement.

Paragraph 8. An actuator according to paragraph 2 or 3, wherein the back drive of both the drive electric motor and the emergency electric motor is greater than a quotient of a torque generated by the actuator drive shaft driving the rotary to linear device to adjust the pressure valve.

Paragraph 9. An actuator according to any of paragraphs 1 to 8, wherein each of the drive electric motor and the emergency electric motor includes a gearhead, each gearhead being configured to provide the back drive torque for the drive electric motor and the emergency electric motor.

Paragraph 10. An actuator according to any of paragraphs 1 to 9, comprising a first power supply a controller and an emergency power supply, the controller being configured to operate the actuator in a first mode in which the first power supply is connected to the drive electric motor to control the pressure valve and in a second fail to known position mode to connect the emergency electric motor to the emergency power supply to the emergency electric motor.

Paragraph 11. An actuator according to any of paragraphs 1 to 10, comprising a first support structure housing the differential gear arrangement, and a second support structure coupled to the first support structure for housing the rotary to linear device and configured to couple the actuator to the pilot valve, wherein the first support structure is made from stainless steel, the second support structure is made from aluminium and the support structure comprises an electrical insulating structure for electrically insulating the first support structure from the second support structure.

Paragraph 12. An actuator according to paragraph 11, wherein at least one O-ring seal is provided between the first support structure and the second support structure and a flexible bellows is provided between the rotary to linear device and the pilot valve.

Paragraph 13. An actuator for adjusting a pilot valve in a gas supply regulator, the actuator comprising:
- a drive electric motor configured to provide rotational movement to a first drive shaft,
- an emergency electric motor configured to provide rotational movement to a second drive shaft,
- a differential gear arrangement coupled to the first drive shaft and coupled to the second drive shaft and configured to generate rotational movement of an actuator drive shaft from the rotational movement provided by one of the first drive shaft and the second drive shaft, and
- a rotary to linear device coupled to the actuator drive shaft and configured to convert rotational movement of the actuator drive shaft into a linear movement for adjusting the pressure valve, wherein the differential gear arrangement is configured in combination with the relative drive torques and back drive torques of each of the drive electric motor and the emergency electric motor so that either of the drive electric motor or the emergency electric motor can provide a drive torque to the actuator drive when one is powered and the other is unpowered, and the drive torque provided by the drive electric motor and the emergency electric motor when powered is arranged with respect to a back drive torque of the drive electric motor and the emergency electric motor so that when one of the drive electric motor or the emergency electric motor is powered, the drive electric motor or the emergency electric motor can overcome a resistive torque of the actuator drive shaft to drive the actuator drive shaft and not drive the other of the drive electric motor or the emergency electric motor when unpowered.

Paragraph 14. A method of operating an actuator to adjust a pilot valve in a gas supply regulator, the method comprising powering either a drive electric motor configured to provide rotational movement to a first drive shaft, or
powering an emergency electric motor configured to provide rotational movement to a second drive shaft, the first drive shaft and the second drive shaft being connected by a differential gear arrangement to an actuator drive shift which drives an actuator drive shaft, from the rotational movement provided by one of the first drive shaft and the second drive shaft, to drive a rotary to linear device coupled to the actuator drive shaft to convert rotational movement of the actuator drive shaft into a linear movement for adjusting the pilot valve, wherein the differential gear arrangement is configured to drive the actuator drive shaft when either of the drive electric motor or the emergency electric motor is powered to provide a drive torque to one of the first drive shaft or the second drive shaft and the other of the drive electric motor and the emergency electric motor unpowered and the drive torque provided by the drive electric motor and the emergency electric motor when powered is arranged with respect to a back drive torque of the drive electric motor and the emergency electric motor so that when one of the drive electric motor or the emergency electric motor is powered, the drive electric motor or the emergency electric motor can overcome a resistive torque of the actuator drive shaft to drive the actuator drive shaft and not drive the other of the drive electric motor or the emergency electric motor when unpowered.

Paragraph 15. A gas supply regulator having an adjustable pilot valve and an actuator according to any one of paragraphs 1 to 11 operable to adjust the pressure valve.

Paragraph 16. A distribution network including the gas supply regulator according to paragraph 15.

The invention claimed is:

1. An actuator for adjusting a pilot valve in a gas supply regulator, the actuator comprising:
- a drive electric motor configured to provide rotational movement to a first drive shaft,
- an emergency electric motor configured to provide rotational movement to a second drive shaft,
- a differential gear arrangement coupled to the first drive shaft and coupled to the second drive shaft and configured to generate rotational movement of an actuator drive shaft from the rotational movement provided by one of the first drive shaft and the second drive shaft, and
- a rotary to linear device coupled to the actuator drive shaft and configured to convert rotational movement of the actuator drive shaft into a linear movement for adjusting the pilot valve, wherein the differential gear arrangement is configured to drive the actuator drive shaft when one of the drive electric motor or the emergency electric motor is powered to provide a drive torque to one of the first drive shaft or the second drive shaft and the other of the drive electric motor and the emergency electric motor unpowered, and the drive torque provided by the drive electric motor and the emergency electric motor when powered is arranged with respect to a back drive torque of the drive electric motor and the emergency electric motor so that when one of the drive electric motor or the emergency electric motor is powered, the drive electric motor or the emergency electric motor can overcome a resistive torque of the actuator drive shaft to drive the actuator drive shaft and not drive the other of the drive electric motor or the emergency electric motor when unpowered, wherein the drive torque provided by the drive electric motor is larger than a maximum resistive torque of a combination of the differential gear arrangement and the actuator drive shaft driving the rotary to linear device for adjusting the pilot valve;

a back drive torque of the drive electric motor is greater than a quotient of a torque of the actuator shaft generated by a combination of the rotary to linear device, the pilot valve and the efficiency of the differential gear arrangement when the drive electric motor is in an unpowered state;

the drive torque of the emergency electric motor is larger than the maximum resistive torque of the combination of the differential gear arrangement and the actuator drive shaft driving the rotary to linear device for adjusting the pilot valve;

a back drive torque of the emergency electric motor is greater than a quotient of a torque of the actuator shaft generated by a combination of the rotary to linear device, the pilot valve and the efficiency of the differential gear arrangement when the emergency electric motor is in an unpowered state; and the drive torque of the drive electric motor is less than a quotient of a combination of the back drive torque of the emergency electric motor and the efficiency of the differential gear arrangement.

2. The actuator as claimed in claim 1, wherein the back drive of both the drive electric motor and the emergency electric motor is greater than a quotient of a torque generated by the actuator drive shaft driving the rotary to linear device to adjust the pilot valve.

3. The actuator as claimed in claim 1, wherein each of the drive electric motor and the emergency electric motor includes a gearhead, each gearhead being configured to provide the back drive torque for the drive electric motor and the emergency electric motor.

4. The actuator as claimed in claim 1, comprising a first power supply a controller and an emergency power supply, the controller being configured to operate the actuator in a first mode in which the first power supply is connected to the drive electric motor to control the pilot valve and in a second fail to known position mode to connect the emergency electric motor to the emergency power supply.

5. The actuator as claimed in claim 1, comprising a first support structure housing the differential gear arrangement, and a second support structure coupled to the first support structure for housing the rotary to linear device and configured to couple the actuator to the pilot valve, wherein the first support structure is made from stainless steel, the second support structure is made from aluminium and the support structure comprises an electrical insulating structure for electrically insulating the first support structure from the second support structure.

6. The actuator as claimed in claim 5, wherein at least one O-ring seal is provided between the first support structure and the second support structure and a flexible bellows is provided between the rotary to linear device and the pilot valve.

7. The actuator of claim 1, comprising the pilot valve.

8. The actuator according to claim 1, comprising a gas supply regulator operatively engaged with at least the rotary to linear device.

9. The actuator of claim 8, comprising a distribution network including the gas supply regulator.

10. A method of operating an actuator to adjust a pilot valve in a gas supply regulator, the method comprising powering either a drive electric motor configured to provide rotational movement to a first drive shaft, or powering an emergency electric motor configured to provide rotational movement to a second drive shaft, the first drive shaft and the second drive shaft being connected by a differential gear arrangement to an actuator drive shaft which drives an actuator drive shaft, from the rotational movement provided by one of the first drive shaft and the second drive shaft, to provide a rotary to linear device coupled to the actuator drive shaft to convert rotational movement of the actuator drive shaft into a linear movement for adjusting the pilot valve, wherein the differential gear arrangement is configured to drive the actuator drive shaft when either of the drive electric motor or the emergency electric motor is powered to provide a drive torque to one of the first drive shaft or the second drive shaft and the other of the drive electric motor and the emergency electric motor unpowered and the drive torque provided by the drive electric motor and the emergency electric motor when powered is arranged with respect to a back drive torque of the drive electric motor and the emergency electric motor so that when one of the drive electric motor or the emergency electric motor is powered, the drive electric motor or the emergency electric motor can overcome a resistive torque of the actuator drive shaft to drive the actuator drive shaft and not drive the other of the drive electric motor or the emergency electric motor when unpowered, wherein the drive torque provided by the drive electric motor is larger than a maximum resistive torque of a combination of the differential gear arrangement and the actuator drive shaft driving the rotary to linear device for adjusting the pilot valve;

a back drive torque of the drive electric motor is greater than a quotient of a torque of the actuator shaft generated by a combination of the rotary to linear device, the pilot valve and the efficiency of the differential gear arrangement when the drive electric motor is in an unpowered state;

the drive torque of the emergency electric motor is larger than the maximum resistive torque of the combination of the differential gear arrangement and the actuator drive shaft driving the rotary to linear device for adjusting the pilot valve;

a back drive torque of the emergency electric motor is greater than a quotient of a torque of the actuator shaft generated by a combination of the rotary to linear device, the pilot valve and the efficiency of the differential gear arrangement when the emergency electric motor is in an unpowered state; and the drive torque of the drive electric motor is less than a quotient of a combination of the back drive torque of the emergency electric motor and the efficiency of the differential gear arrangement.

11. The actuator as claimed in claim 10, wherein the drive torque of the emergency electric motor is less than a quotient of a combination of the back drive torque of the drive electric motor and the efficiency of the differential gear arrangement.

12. The method as claimed in claim 10, wherein the drive torque of the emergency electric motor is less than a quotient of a combination of the back drive torque of the drive electric motor and the efficiency of the differential gear arrangement.

13. The method as claimed in claim 10, wherein the back drive of both the drive electric motor and the emergency electric motor is greater than a quotient of a torque generated by the actuator drive shaft driving the rotary to linear device to adjust the pilot valve.

14. The method as claimed in claim 10, wherein each of the drive electric motor and the emergency electric motor includes a gearhead, each gearhead being configured to provide the back drive torque for the drive electric motor and the emergency electric motor.

15. The method as claimed in claim 10, comprising operating the actuator in a first mode in which the first power supply is connected to the drive electric motor to control the pilot valve and in a second fail to known position mode to connect the emergency electric motor to the emergency power supply.

* * * * *